United States Patent
Iwayama et al.

(10) Patent No.: US 7,966,307 B2
(45) Date of Patent: Jun. 21, 2011

(54) DOCUMENT SEARCH METHOD AND DOCUMENT SEARCH APPARATUS THAT USE A COMBINATION OF INDEX-TYPE SEARCH AND SCAN-TYPE SEARCH

(75) Inventors: Makoto Iwayama, Tokorozawa (JP); Kazutomo Ushijima, Fuchu (JP); Osamu Imaichi, Koganei (JP); Tomohiro Yasuda, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 436 days.

(21) Appl. No.: 12/133,811

(22) Filed: Jun. 5, 2008

(65) Prior Publication Data
US 2008/0306919 A1 Dec. 11, 2008

(30) Foreign Application Priority Data
Jun. 7, 2007 (JP) .................................. 2007-151860

(51) Int. Cl.
*G06F 7/00* (2006.01)
*G06F 17/00* (2006.01)
(52) U.S. Cl. ........................................ 707/706; 707/713
(58) Field of Classification Search .......................... None
See application file for complete search history.

(56) References Cited

U.S. PATENT DOCUMENTS
7,305,385 B1 * 12/2007 Dzikiewicz et al. .......... 707/745
2002/0147880 A1 * 10/2002 Wang Baldonado ............. 711/1
2008/0154882 A1 * 6/2008 Chigusa et al. .................... 707/5

OTHER PUBLICATIONS

A. Aho et al., "Efficient String Matching: An Aid to Bibliographic Search", Communications of the ACM, 18(6), pp. 333-340, 1975.
Baeza-Yates et al., "Multiple String Matching", Modern Information Retrieval, Addison-Wesley, pp. 54-59, 1999.
Navarro et al., "Indexing and Searching", Flexible Pattern Matching in String, Chapter 8, pp. 191-199, 2002.

* cited by examiner

*Primary Examiner* — Uyen T. Le
(74) *Attorney, Agent, or Firm* — Brundidge & Stanger, P.C.

(57) ABSTRACT

A document search apparatus capable of an index-type search and a scan-type search performs a search in a combination of the two search types while compensating for the disadvantages of the two search types with each other. A search query for index-type search and a search query for scan-type search are constructed based on a search query consisting of a logical formula of keywords. Then, a character 2-gram for performing an index search is set to shorten the whole search time, and the index-type search is performed. Finally, a scan-type search is performed on this search result of the index-type search.

15 Claims, 8 Drawing Sheets

| Term | Term ID |
|---|---|
| "JOU-HOU" | 1 |
| "HOU-KEN" | 2 |
| "KEN-SAKU" | 3 |
| "SAKU-NO" | 4 |
| ... | ... |

401  402

| Term ID | Number of documents | Document ID list |
|---|---|---|
| 1 | 4 | [31, 174, 312, 592] |
| 2 | 1 | [2936] |
| 3 | 192 | [9, 21, 22, 23, ···] |
| 4 | 3 | [83, 511, 1002] |
| ... | ... | ... |

| Document ID | Offset | Length |
|---|---|---|
| 1 | 0 | 214 |
| 2 | 214 | 361 |
| 3 | 575 | 183 |
| 4 | 758 | 59 |
| ... | ... | ... |

S601 Input
    Search Query: Q
  Output
    Search query for index-type search: Qindex
    Search query for scan-type search: Qscan S602 Qscan←Q S603 A set of keywords included in Q is denoted as
Qw = {w_1, w_2, ...}.

S604 Each w_i of Qw is divided into character 2-gram
and is denoted as
wb_i = {b_i1, b_i2, ...}.
Further, a set of divided character 2-grams is denoted
as
WB = {b_1, b_2, ...}
Where duplicated one is omitted.

S605 Qindex1 is a search query obtained by replacing
each w_i ∈ Qw of Q with a conjunction
"b_i1 * b_i2 *..." of construction character 2-grams.

S606 Identify a set of character 2-grams to be searched
using index-type search from WB, and the set thus
identified is denoted as WB1. WB2 is obtained by
WB-WB1. Use Tmax in identifying WB2.

S607 Qindex is a search query obtained by replacing each
b_i ∈ WB2 in Qindex with a truth constant (T).

FIG. 7

S701 Input
Search query after divided into character 2-gram: Qindex1
A set of character 2-grams: WB = {b_1, b_2, ...}
Output
A set of character 2-grams with which index-type search is performed WB1: WB1 ⊆ WB
Constants
Time of reading index cells (cell/sec): IT
Average length of documents (bytes): DL
Speed of scanning characters (bytes/sec): ST S702 Calculate number of hits n_i using index DB for each b_i of WB S703 Start loop processing:
Calculate estimated time of searching T_i for each element b_i of WB, when character 2-gram having more number of hits than b_i is regarded as hitting all documents.

S704 Calculation of number of reading index cells (DF):
A sum of the number of hits of character 2-gram having less number of hits than DF=b_i S705 Calculation of the estimated value DN of the number of documents for scan-type search:
For character 2-gram having more number of hits than b_i, the number of hits is regarded as hitting all documents, and then calculate DN from Qindex1 by using the following rules.
b_i AND b_j → min(n_i, n_j)
b_i OR b_j → n_i + n_j S706 Calculate the estimated time of searching T_i from the following formula:
T_i = DF／IT ＋ (DN × DL)／ST S707 The loop process ended:
Character 2-gram (in WB) having less number of hits than character 2-gram that gives minimum value of T_i is set to the element of WB1.

FIG. 8

Identify character 2-gram for index-type search

S801
Input
  Search query after divided into character 2-gram: Qindex1
  A set of character 2-grams: WB = {b_1, b_2, ...}
Output
  A set of character 2-grams with which index-type search is performed WB1: WB1 ⊆ WB
Parameter:
  Target time of searching: Tmax
Constants
  Time of reading index cells (cell/sec): IT
  Average length of documents (bytes): DL
  Speed of scanning characters (bytes/sec): ST

S802 Calculate number of hits n_i from index DB for each b_i of WB, and then sort WB in ascending order of n_i to obtain WBsort.

S803 Calculation of the estimated value DN of the number of documents for scan-type search:
  Calculate DN using the following rules in a logical formula in Qindex1.
    b_i AND b_j → min(n_i, n_j)
    b_i OR b_j → max(n_i, n_j)

S804 Calculate a threshold DFT of the number of reading index cells using the following equation.
  Tmax = DFT／IT ＋ (DN × DL)／ST

S805 Calculate a cumulative sum of the number of hits sequentially from the head element of WBsort, and then elements in which the cumulative sum does not exceed DFT are determined as the elements of WB1.

FIG. 9

DOCUMENT SEARCH METHOD AND DOCUMENT SEARCH APPARATUS THAT USE A COMBINATION OF INDEX-TYPE SEARCH AND SCAN-TYPE SEARCH

CLAIM OF PRIORITY

The present application claims priority from Japanese application JP 2007-151860 filed on Jun. 7, 2007, the content of which is hereby incorporated by reference into this application.

BACKGROUND OF THE INVENTION

1. Field of the Invention

The present invention relates to a document search technique using a combination of two search methods of an index-type search and a scan-type search while compensating for the disadvantages of the two search methods with each other.

2. Description of the Related Art

There are two methods for searching a document. The first one is a method called a scan-type search in which a document satisfying a search query is retrieved while documents to be searched are checked one by one. Actually, whether or not each search keyword appears is checked while each document is read from the beginning part. An AC method (Aho, A. V, Corasick, J., "Efficient string matching: an aid to bibliographic search," Communications of the ACM, 18(6), pp. 333-340, 1975), a CW method (Gonzalo Navarro, Mathieu Raffinot, "Flexible Pattern Matching in String," Cambridge University Press, 2002) to perform skip reading, and the like are known as the scan algorithm. The other one is a method called an index-type search in which: a list (index) of documents including each search term is constructed in advance, and in which, at the time of searching, an index is checked to obtain a set of documents of search results. For the details of the index-type search, including the method of constructing the index, see Baeza-Yates, R., Ribeiro-Neto, B., "Modern Information Retrieval," Addison-Wesley, 1999.

The two methods described-above have advantages and disadvantages, respectively. The scan-type search is slow in searching because the documents are checked one by one. On the other hand, the index-type search is fast in searching because only the index constructed in advance needs to be checked. However, the index in addition to the document data needs to be maintained. Depending on the information included in the index, the index size may be several times as large as the total document size. Moreover, every time a document to be searched is added, deleted or modified, the index also needs to be updated to reflect the latest condition. In the scan-type search, in contrast, secondary data such as the index is not required, and the search can be performed only if the original document data exists.

Moreover, even though the index-type search is fast, the search speed becomes slow in proportion to the increase in search keyword. Especially in the case where the index is compressed, this tendency is prominently true due to the decompressing processing of the compressed index. Under some circumstances, the search speed may become even slower than that in the scan-type search. Generally, the search speed of the index-type search is inversely proportional to the total number of hit documents for all the search terms. On the other hand, the search speed of the scan-type search does not depend largely on the search query.

A hybrid type search can be conceivable in which above-described two methods are combined. The conventional search using a character component table can be categorized as the hybrid type search. In this search, an index-type search is firstly performed by using a simple and small size index. Subsequently, a scan-type search is performed to a set of documents of the search results. The index-type search here only needs to function as a screen, and does not have to achieve an accuracy of 100% but only has to provide a search result having no documents overlooked. Indexes employable as such index include an index of character 2-grams in which neither a character component table nor positional information is stored, and other kinds of indexes. When the index-type search as a screening function is performed prior to the scan-type search, it is not necessary to check all documents by using the scan-type search. Thus, the disadvantage of slow speed in the scan-type search can be overcome. It should be noted, however, that the index is still required even through the size is small.

SUMMARY OF THE INVENTION

Even if the hybrid-type search is performed, the index-type search may become slow in some cases depending on the search query and accordingly may not produce any advantageous effect. As described above, when a search query includes a large number of search terms that can appear in any document, the list of documents in the index needs to be decompressed a large number of times. This increase in the number of decompressing times makes the speed of the index-type search slower. In extreme cases, performing the scan-type search alone may be faster than performing the hybrid-type search. However, because such case is very rare, the average speed of the index-type search often may not be obviously decreased. Nevertheless, if a certain speed must be secured even for the worst case, a countermeasure should be taken against such a rare case described above.

By following a policy in which the scan search is performed only when a search query include a larger number of such search terms, which can appear in any document exceeds, than a particular threshold, it is possible to secure the worst search speed equal to the speed at which all documents are scanned. However, in this case, the threshold needs to be determined experimentally. Moreover, since search queries include a large number of partial logical expressions that are effective to narrow down document, it is wasteful to perform the scan-type search without using the information of the partial logical expressions.

On the other hand, the scan-type search also has a disadvantage. If the CW method is used as the scan algorithm, a high-speed scan is possible due to the effect of skip reading. Roughly speaking, assuming that the minimum length of keywords in the search query is denoted by L, the skip reading is a technique to skip scanning of characters by using the fact that no keyword exists within a range of i+L if the i-th character in a document to be searched does not appear in any keyword of the search query. However, when even one short keyword exists in the search query, the number of characters that can be skipped is decreased accordingly. In this case, the search speed becomes equal to or slower than that of the AC method in which skip reading is not performed.

In the present invention, for the purpose of addressing the above-described problems, a search query is divided into the search query for index-type search and the search query for scan-type search to perform a hybrid-type search. In this dividing processing, the search speed of the hybrid-type search is estimated for each search query, and then the search query is divided so that the estimated search speed may take a minimum value. Specifically, the number of hits of each search term in a search query is firstly acquired from the index. Then, an estimated speed is calculated for each search term (called a target search term, here) by regarding, as hitting all documents, other search terms in the search query each having a larger number of hits than the target search term, for the sake of convenience. In the index-type search, a document list for a search term that is regarded as hitting all the documents does not need to be obtained, so that the search time in the index-type search can be saved. The characteristic is used here that a search term leading to a larger number of hits requires a longer search time in the index-type search, but would not have much influence on the narrowing effect on the search even though the term is regarded as hitting all the documents.

With respect to the problems concerning the scan-type search, if an index used in the index-type search is set in the unit of character 2-gram, then the search for a short one-character or two-character keyword is completed in the index-type search. In the present invention, the result in the index-type search is utilized for a short character string for which the search is completed only in the index-type search so that the short keyword may not be checked in the scan-type search (in the CW method, in particular).

Regarding, as hitting all documents, a search term having a larger number of hits allows the search of the search term to be omitted in the index-type search. In this way, the speed of the index-type search as well as the speed of the hybrid-type search can be improved without reducing the narrowing rate to a large extent. In addition, by relaying only on the index-type search for the search of a short keyword, the skip-reading effect on the scan-type search is increased. Accordingly the speed of the scan-type search and consequently the speed of the hybrid-type search can be improved.

DESCRIPTION OF THE PREFERRED EMBODIMENTS

Hereinafter, embodiments of the present invention will be described with reference to the accompanying drawings.

Embodiment 1

Figure 1:
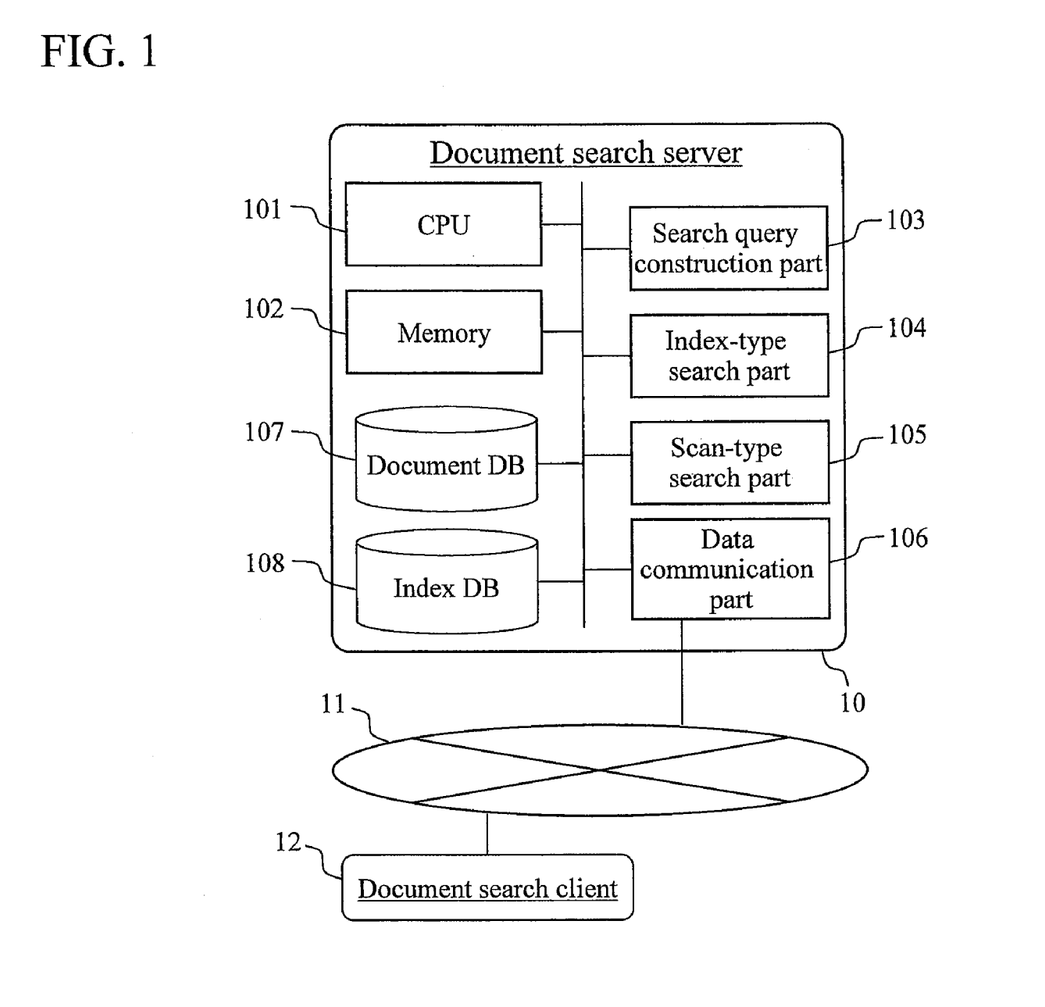
FIG. 1 is a block diagram of an entire document search apparatus according to an embodiment of the present invention.

FIG. 1 is a diagram showing a system configuration example of a document search apparatus of the present invention. The document search apparatus comprises a document search server 10, a network 11, and a document search client 12.

The document search server 10 comprises a CPU 101, a memory 102, a document DB 107, and an index DB 108. In addition, the document search server 10 includes programs configuring to a search query construction part 103, an index-type search part 104, and a scan-type search part 105, as well as a data communication part 106.

The CPU 101 performs various processings by running various kinds of programs configuring to the search query construction part 103, the index-type search part 104, and the scan-type search part 105. The memory 102 temporarily stores the programs run by the CPU 101 and the data required to run the programs.

The data communication part 106 is an interface to carry out data communication via the network 11, and is configured of, for example, a LAN card capable of communicating via a TCP/IP protocol. The document search server 10 communicates with the document search client 12 connected to the network 11, via the data communication part 106.

The document search client 12 receives a search query from a user, sends the search query to the document search server 11 via the network 11, then receives the search results from the document search server 11 again via the network 11, and finally shows the search results to the user. The description of the internal configuration of the document search client 12 is omitted.

Documents to be searched are registered within the document DB 107. In the scan-type search part 105, the search is performed for the documents in the document DB 107. In the index DB 108, a list (index) of documents including the each search term and the number of the documents are registered. In this embodiment, a character 2-gram is used as the search term. For the details of a means for configuring the document DB 107 from the documents to be searched, see Baeza-Yates, R., Ribeiro-Neto, B., "Modern Information Retrieval", Addison-Wesley, 1999. In the index-type search part 104, the search is performed using the information in the index DB.

Figure 2:
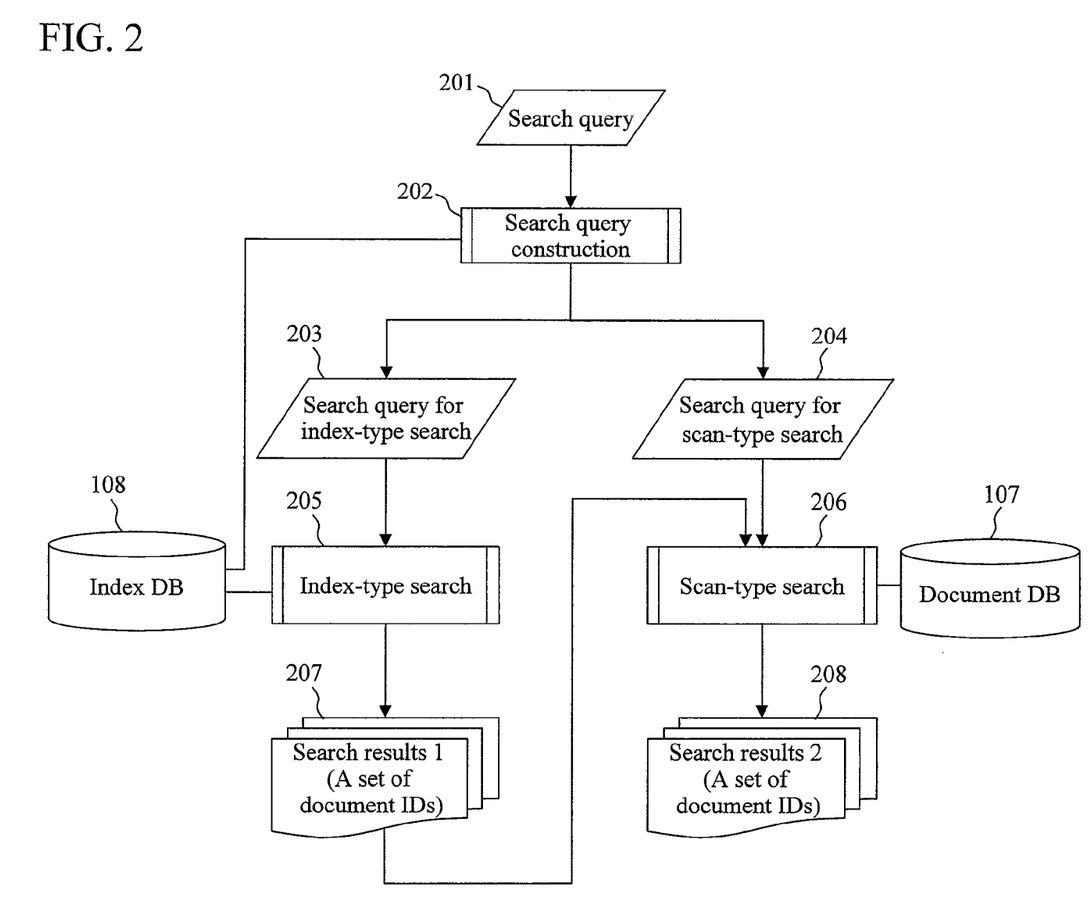
FIG. 2 is a flow chart of the processing operated in a document search server of Embodiments 1 and 2 of the present invention.

FIG. 2 is a chart showing a whole flow of the search processings performed in the document search apparatus. Hereinafter, with reference to FIG. 2, an overview of the processings performed with the search query construction part 103, the index-type search part 104, and the scan-type search part 105 is described.

Firstly, a search query 201 is sent from the document search client 12. The search query here is the one in which keywords are combined using a logical formula, such as ("bun-syo (document)"+"ga-zou (image)")*"ken-saku-syo-ri (search processing)" written in Chinese characters. This example is a search query for picking up a document including "bun-syo" or "ga-zou" as well as "ken-saku-syo-ri" written in Chinese characters.

Next, a search query construction step 202 constructs a search query for index-type search 203 and a search query for scan-type search 204 based on the search query 201. This time, the search query construction step 202 constructs each search query in a way that the final estimated search speed becomes the fastest, by acquiring the necessary information from the index DB 108. The details of the search query construction 202 will be described later.

Once the search query for index-type search 203 and the search query for scan-type search 204 are constructed, an index-type search 205 is performed first. Since Baeza-Yates, R., Ribeiro-Neto, B., "Modern Information Retrieval", Addison-Wesley, 1999 provides the details of the index-type search, the description of the index-type search is omitted here. A document satisfying the search query for index-type search 203 inputted is searched using the index DB 108. The searched results are then outputted to search results 1 (207) as a document ID list.

Subsequently, a scan-type search 206 is performed on the search results 1 (207) that have been searched by the index-type search. The AC method in Aho, A. V., Corasick, J., "Efficient string matching: an aid to bibliographic search", Communications of the ACM, 18(6), pp. 333-340, 1975, the CW method in Gonzalo Navarro, Mathieu Raffinot, "Flexible Pattern Matching in String", Cambridge University Press, 2002, or the like can be used as the method of scan-type search. The scan-type search 206 acquires a main body of a document corresponding to each document ID of the search results 1 (207) from the document DB 107, and then determines whether or not this document body satisfies the search query for scan-type search 204. A set of documents satisfying the search query for scan-type search 204 are shown as search results 2 (208), that is, the final search results.

Hereinafter, firstly the detail of each database (document DB 107, index DB 108) is described, and then the detail of the procedure in the search query construction 202 of FIG. 2 is described.

Figure 4:
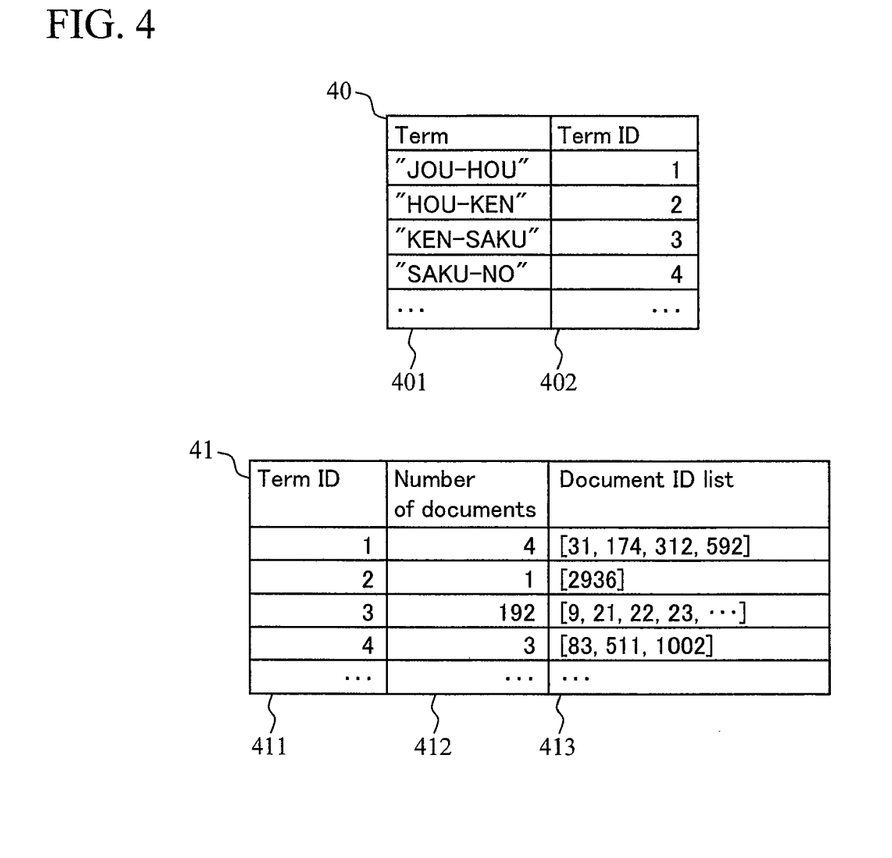
FIG. 4 is an example list showing a term table and an index table included in an index DB.

FIG. 4 is an example list showing the configuration of a table stored in the index DB 108. The index DB 108 stores two types of tables, a term table 40 and an index table 41.

The term table 40 is a table for converting a term 401 into a term ID 402. The term table 40 is implemented internally using a hash table or the like. The term refers to the smallest unit of character string used in the search. In this embodiment, a character 2-gram is used as the term. For example, a character string of "ken-saku-syo-ri (search processing)" written in Chinese characters is divided into three character 2-grams, i.e., "ken-saku," "saku-syo," and "syo-ri," which are then registered as the terms. The index table 41 is a table for searching from each term 411 the number of documents 412 including the relevant term, and an actual document ID list 413. The index table 41 is implemented internally with an array or the like.

Although a character 2-gram is used as the term here, it should be noted that a character 1-gram, a character 3-gram, or the like may be also used as the term. Furthermore, the type of term used for each character type may be differentiated in such manner that a character 3-gram is used only for Katakana letters. Generally, if the number N of a character N-gram is increased, the search noise is reduced. For example, in a case where "hon-hatsu-mei (present invention)" written in Chinese characters is expressed with a character 1-gram, it is divided into "hon", "hatsu", and "mei", which matches with a character string of "hon-no-hatsu-kan-ha-a-su-da (the book will be published tomorrow)". If "hon-hatsu-mei" is expressed with a character 2-gram, it is divided into "hon-hatsu" and "hatsu-mei", which does not match the above-described character string but matches a character string of "hon-hatsu-pyou-de-ha . . . no-hatsu-mei-wo-setsu-mei-su-ru (this presentation provides explanations about . . . )". In a case where a character 3-gram is used, "hon-hatsu-mei" will match only with a character string that includes "hon-hatsu-mei" completely. On the other hand, the disadvantage with the increased number N is the increase in the size of the index table 41. If a character 3-gram is used, the index table 41 may become several times as large as the size of the original character strings. The character 2-gram is known empirically as a well-balanced term in terms of the search noise and the size of the index table. Therefore the character 2-gram is used as the term in this embodiment.

Figure 5:
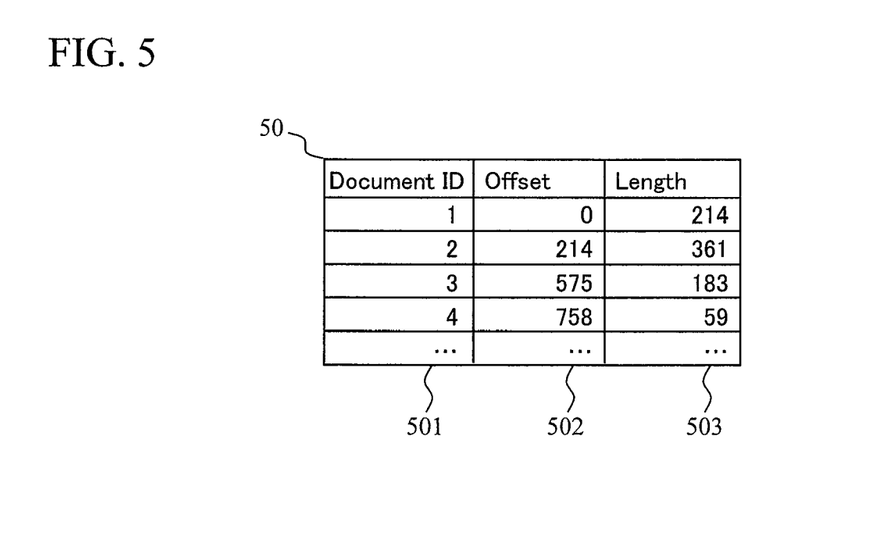
FIG. 5 is an example list showing a document data table included in a document DB.

FIG. 5 is an example list showing the configuration of a table stored in the document DB 107. The document DB 107 stores a document data table 50 for searching the main body of each document. The document data table 50 is a table for acquiring an offset 502 and a length 503 of the relevant document from a document ID 501. The document body is arranged on a disc or on a memory. The offset 502 indicates the head position where the document body is arranged, and the length 503 indicates the length from the offset. The document data table 50 is implemented with an array or the like.

Figure 6:
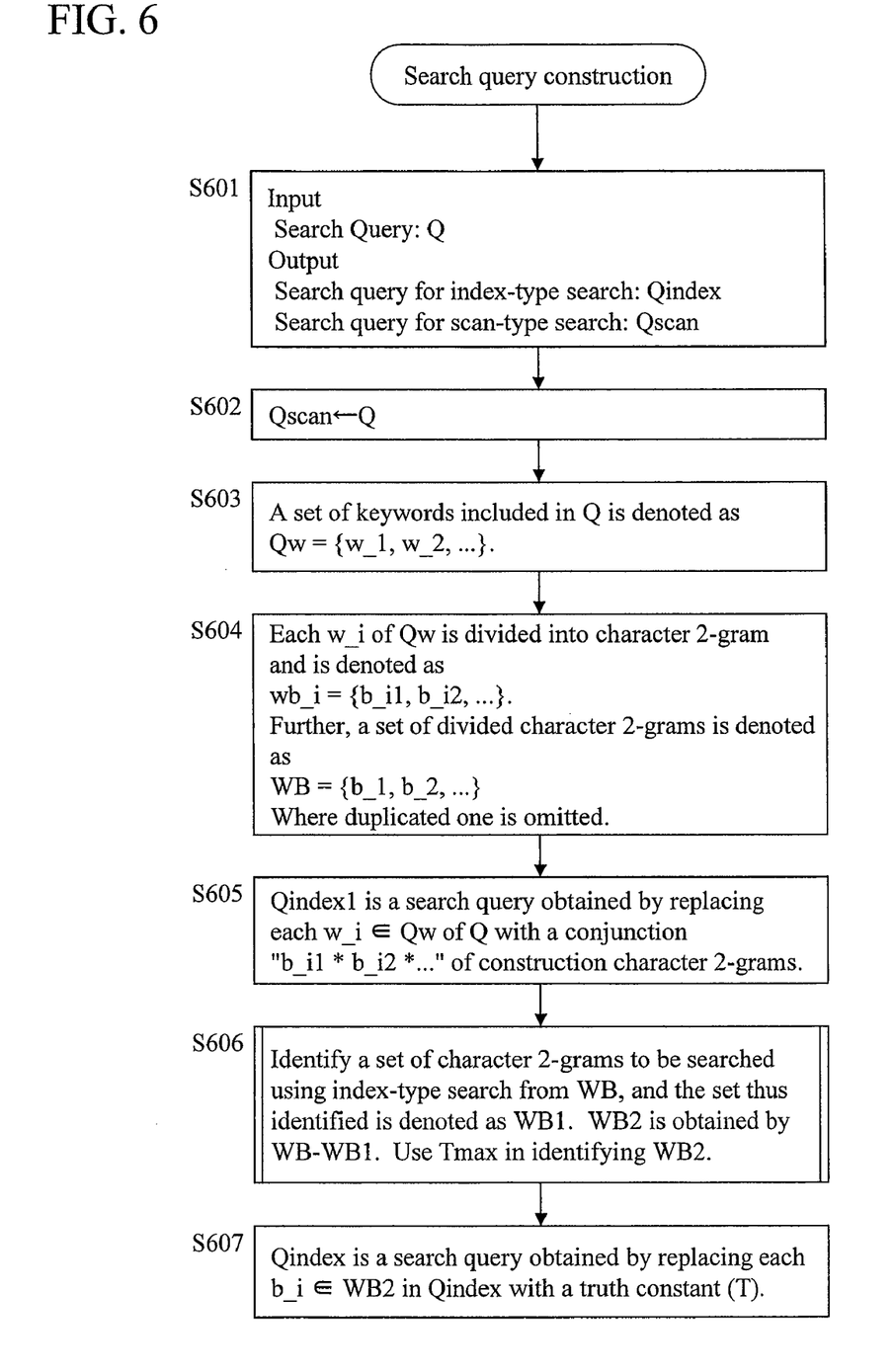
FIG. 6 is a flowchart of a search query construction according to an embodiment of the present invention.

FIG. 6 is a flowchart showing the procedure of the search query construction 202. The search query construction 202 is performed in the search query construction part 103. The search query construction 202 performs the initial setting first (S601). Reference numeral Q represents a search query, and for example, $$Q=(\text{``bun-syo''}+\text{``ga-zou''})*\text{``ken-saku-syo-ri''}$$

Here, "+" expresses an OR search and "*" expresses an AND search. The search query construction 202 outputs a search query Qindex for the index-type search and a search query Qscan for the scan-type search. The search queries Qindex and Qscan each are obtained by transforming the inputted search query Q.

Firstly, the search query Qscan for scan-type search is constructed (S602). In this embodiment, the original search query Q is set for the scan-type search. Such search query construction procedure that compensates the disadvantage of the scan-type search will be described later in an alternative embodiment.

In the following steps S603 to S607, the search query Qindex for the index-type search is constructed. Firstly, a set of keywords included in Q is denoted as Qw (S603). In this example, $$Qw=\{\text{``bun-syo''}, \text{``ga-zou''}, \text{``ken-saku-syo-ri''}\}$$

Next, in S604, each keyword $w\_i$ of Qw is divided into character 2-grams to obtain $wb\_i$. Additionally, a set of all the divided character 2-grams is denoted as WB. In WB, duplicated ones are omitted. In this example, $wb\_i$ for a keyword $w\_i$ of "ken-saku-syo-ri" is expressed, for example, by the following query.

$$wb\_i=\{\text{``ken-saku''}, \text{``saku-syo''}, \text{``syo-ri''}\}$$

Moreover, WB is expressed, for example, by the following query.

$$WB=\{\text{``bun-syo''}, \text{``ga-zou''}, \text{``ken-saku''}, \text{``saku-syo''}, \text{``syo-ri''}\}.$$

The above example corresponds to the case where each search keyword is divided by character 2-grams.

Next, a search query having each keyword $w\_i$ in the search query Q replaced with a conjunction (AND) of all the character 2-grams of the corresponding set of character 2-grams $wb\_i$ is denoted as Qindex1 (S605). In the example, Qindex1 is expressed by the following query.

$$Qindex1=(\text{``bun-syo''}+\text{``ga-zou''})*(\text{``ken-saku''}*\text{``saku-syo''}*\text{``syo-ri''})$$

Basically, the index-type search may be performed using this search query. However, with the increasing number of character 2-grams having large number of hits, the speed of the index-type search decreases as already explained.

Figure 7:
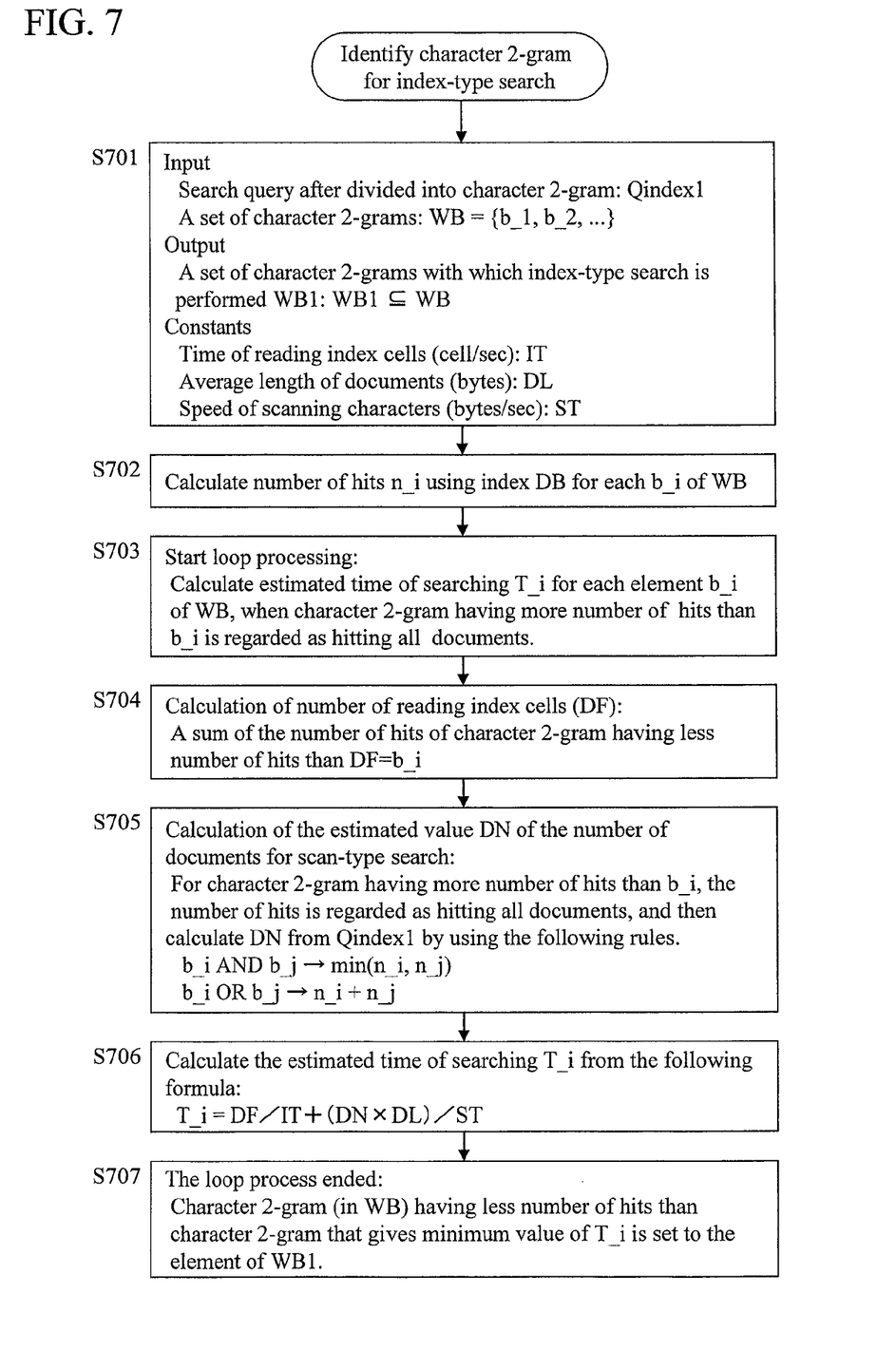
FIG. 7 is a flowchart to identify a character 2-gram for index-type search of Embodiments 1 and 3 of the present invention.

Accordingly, in S606, only character 2-grams with which the index-type search is actually performed are chosen as WB1 among a set of all the character 2-grams WB in the search query. Accordingly, a set of character 2-grams with which the index search is not performed is expressed by WB2=WB−WB1. The actual selection processing is shown in FIG. 7. The description on FIG. 7 will be given later.

Once WB1 is determined, a character 2-gram belonging to WB2 in Qindex1 is replaced with a truth constant "T" to obtain the final Qindex. In this example, when $$WB2=(\text{"bun-syo", "syo-ri"})$$

is obtained by the later-described processing in FIG. 7, then $$Qindex1=(T+\text{"ga-zou"})*(\text{"ken-saku"}*\text{"saku-syo"}*T)$$

is obtained. Actually, the index-type search does not perform the search on the truth constant "T". In the index-type search, the truth constant "T" is equivalent to the hitting all documents. Furthermore, because a partial logical query jointed to the truth constant T with OR is also true, it is possible not to search for the character 2-gram included in this partial search query. For example, (T+"ga-zou") is always true in the above example, so the search for "ga-zou" is not needed. As a result, the search query can be further simplified into T*("ken-saku"*"saku-syo"*T).

FIG. 7 is the procedure to choose a set of character 2-grams WB1 used in the index-type search among a set of character 2-grams WB included in a search query. Firstly, the initial setting is performed in S701. In this processing, Qindex1 and WB are inputted, while WB1 is outputted. Moreover, time of reading index cells IT (cells/sec), an average length of documents to be searched DL (bytes), and a speed of scanning characters ST (bytes/sec) are set in advance as the value of constant for estimating the search speed. The time of reading index cells IT is an average time (sec) of reading each cell of the index. Specifically, the time of reading index cells IT is time for reading each element (document ID) on the document ID list 413 corresponding to the term ID 41, in the index DB 108. Since the document ID list 413 is usually compressed, the decompressing time accounts for large part of IT.

Next, in S702, the index DB 108 is subtracted in advance from each character 2-gram b_i of WB to obtain the number of hits n_i. The number of documents 412 of the index table 41 corresponds to the number of hits. Since the document ID list 413 is not used in this processing, the processing time is negligibly small. In this example, suppose the following numbers of hits are obtained:

| | |
|---|---|
| "bun-syo" | → 1120 |
| "ga-zou" | → 531 |
| "ken-saku" | → 36 |
| "saku-syo" | → 21 |
| "syo-ri" | → 1639 |

Next, the estimated time of searching T_i for each term b_i of WB is calculated, regarding a term having a larger number of hits than the term b_i as hitting all documents (S703). As previously described, the index-type search is not performed for a term regarded as hitting all documents. The larger number of hits a term has, the smaller deviation of the estimated search time from the actual search time is obtained even if the term is regarded as hitting all documents.

In order to calculate the estimated time of searching T_i, the number of reading index cells DF is calculated first (S704). DF is a sum of: the numbers of hits of terms having equal or less number of hits than b_i; and the number of hits of b_i itself.

Next, an estimated value DN of the number of documents for scan-type search is estimated (S705). The number of documents for scan-type search is equal to the number of documents as a result of the index-type search. In order to estimate the number of documents as a result of the index-type search, the number of search results is estimated based on the following rules in each partial search query of the search query Qindex1 of the index-type search. Firstly, when the search terms b_i and b_j are jointed with AND, the smaller one of the numbers of hits n_i and n_j is used as the estimated number of the search results. Moreover, when jointed with OR, a sum of the numbers of hits is used as the estimated number. However, when the sum exceeds the number of all documents, the number of all documents is used as the estimated number. In either case, the number of hits is estimated generously and thus the estimated number never falls below the actual number of hits. The search number when the search is performed with the search query Qindex1 is estimated with the use of the rule described above. However, it should be noted that since a term having a larger number of hits than b_i is regarded as hitting all documents, these numbers of hits are equal to the number of all documents.

For example, in the above example, DN in a case where the terms ("bun-syo" and "syo-ri") having a larger number of hits than "ga-zou" are regarded as hitting all documents is given as follows. Assume the number of all documents is 5000.

$$\min\{5000+531, \min\{1120, 36, 5000\}\}=36$$

Here, although "bun-syo" and "syo-ri" are assumed as hitting all documents, it is found that the final DN is not adversely affected by this assumption since the original number of hits is large enough.

With the use of the number of reading index cells DF and the estimated value DN of the number of documents for scan-type search both calculated as above, the estimated time of searching, T_i, is calculated from the formula below (S706).

$$T\_i=DF/IT+(DN*DL)/ST$$

This is a sum of the estimated time of searching DF/IT of the index-type search plus the estimated time of searching, (DN*DL)/ST of the scan-type search.

As described above, the estimated time of searching, T_i on each term b_i of WB is estimated in a case where a term having a larger number of hits than the term b_i (i.e., in a case where the search is not be performed) is regarded as hitting all documents (S703). Therefore, the actual search may be also performed with the use of the minimum value of T_i. In other words, when a term giving the minimum value of the estimated time of searching is denoted as b_min, b_min and a term having equal to or less number of hits than b_min are used as the search term WB1 with which the index-type search is actually performed (S707).

The search queries for index-type search and for scan-type search are constructed based on the original search query through the processing described so far. For the rest of the procedure, as already described in FIG. 2, the two types of searches may be combined using the search queries. According to this embodiment, a search term of the index-type search can be chosen so that the estimated time of searching takes a minimum value.

Embodiment 2

In Embodiment 1, in identifying the search term WB1 for performing index-type search, the number of hits for all the search term is once checked and a search term having a larger number of hits than the other search terms is regarded as hitting all documents. Then the estimated value DN of the number of documents for scan-type search in this case is calculated (S705). However, when the search query becomes long, it is less preferable in terms of computation time, to calculate DN as many times as the number of search terms. In this embodiment, a method of determining the search term WB1 is employed that does not require much computation time. Embodiment 2 is the same as Embodiment 1 other than the point above.

Figure 8:
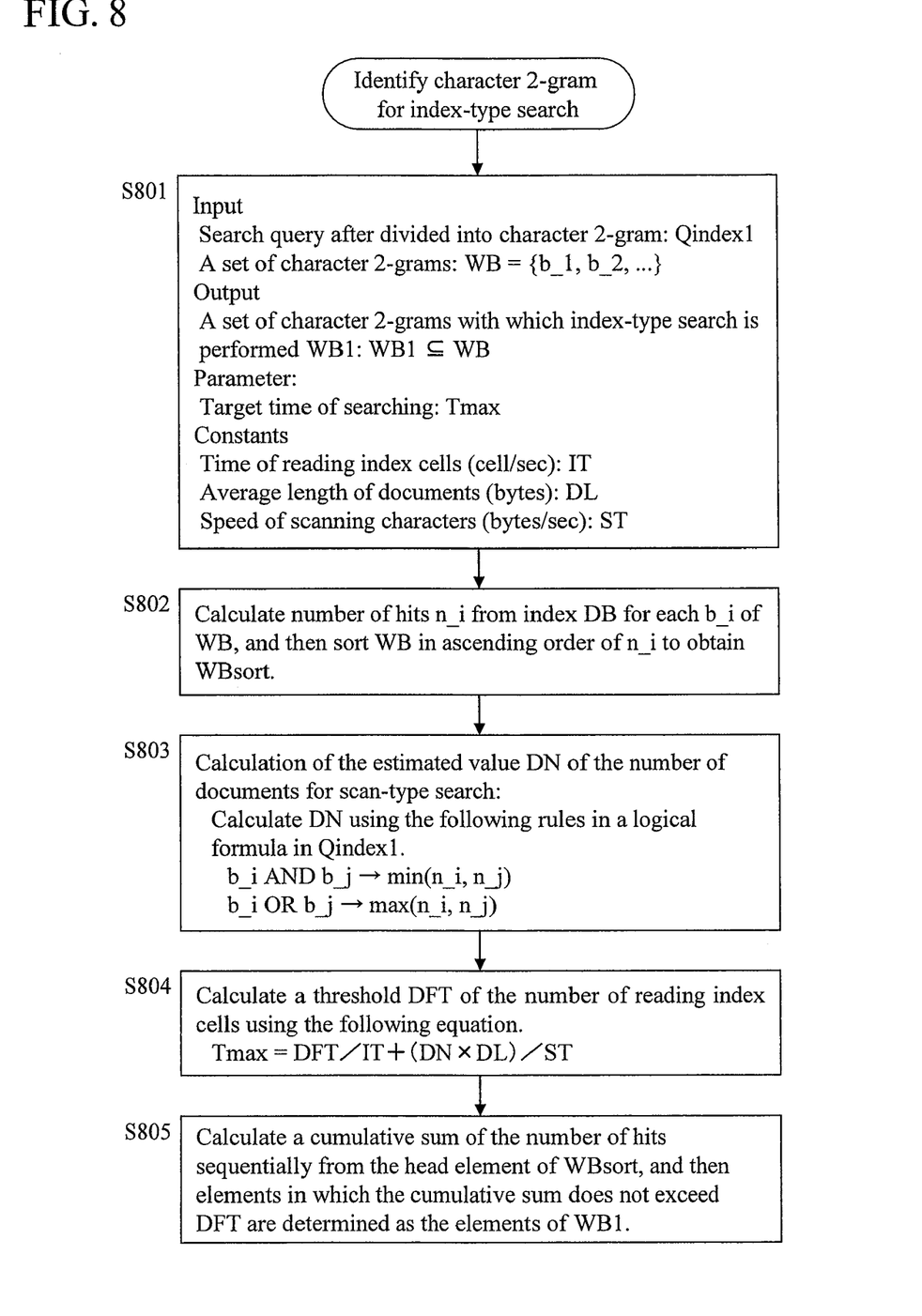
FIG. 8 is a flowchart to identify a character 2-gram for index-type search of Embodiments 2 and 3 of the present invention.

FIG. 8 is an identification processing procedure of a character 2-gram for the index-type search, in this embodiment. This corresponds to the procedure of FIG. 7 in Embodiment 1.

Firstly, the initial setting is performed in S801. The processing point which is different from the S701 is that a target time of searching Tmaxis given in advance as a parameter. In this embodiment, the search term is chosen in a way that the search time is almost within Tmax. The computation time is saved by performing approximation at that time.

In S802, the number of hits n_i is acquired from the index DB 108 on each element b_i of a set of search terms WB, and then WB is sorted in ascending order of the number of hits. The sorted result is denoted as WBsort.

Next, the number of documents for scan-type search DN is calculated using the similar rule as in S705 (S803). However, here, none of search term is assumed of hitting all documents, and the original number of hits obtained in S802 is used. In other words, although DN should normally be re-calculated for each search term, here DN which approximates the number of hits in all the cases is obtained without using the assumption of hitting all documents.

Next, such a threshold DFT of the number of reading index cells in which the search time is within a given search time Tmax is obtained by solving the formula below (S804).

$$Tmax=DFT/IT+(DN*DL)/ST$$

Finally, a cumulative sum of the number of hits is calculated in the order from the head element of WBsort, and the elements in which the cumulative sum does not exceed DFT are used as the elements of a set of search terms WB1 for performing the index-type search actually. According to this embodiment, it is possible to construct a search query in which even the worst search time would be almost within Tmax.

Embodiment 3

In the Embodiment 1 and Embodiment 2, the original search query is used without any modification as the search query of scan-type search. It is said that the search speed for the scan-type search is fixed no matter what search query is used. However, as already explained, for the CW method that performs skip reading, the search speed depends largely on the length of the shortest keyword. When there is even one short keyword in a search query, the numbers of characters to be skipped during scanning are decreased and the search time would increase accordingly with the influence of this keyword.

In this embodiment, a method is described, in which such a disadvantage of the scan-type search is compensated by interoperating the index-type search and the scan-type search more closely. In the index-type search, when a character 2-gram is used as the term to be registered in the index, performing only the index-type search with a one-character or two-character keyword can return a search result having neither an omission nor an error. Accordingly, the scan-type search is not needed on such a short keyword when the search result of the index-type search is utilized.

Figure 3:
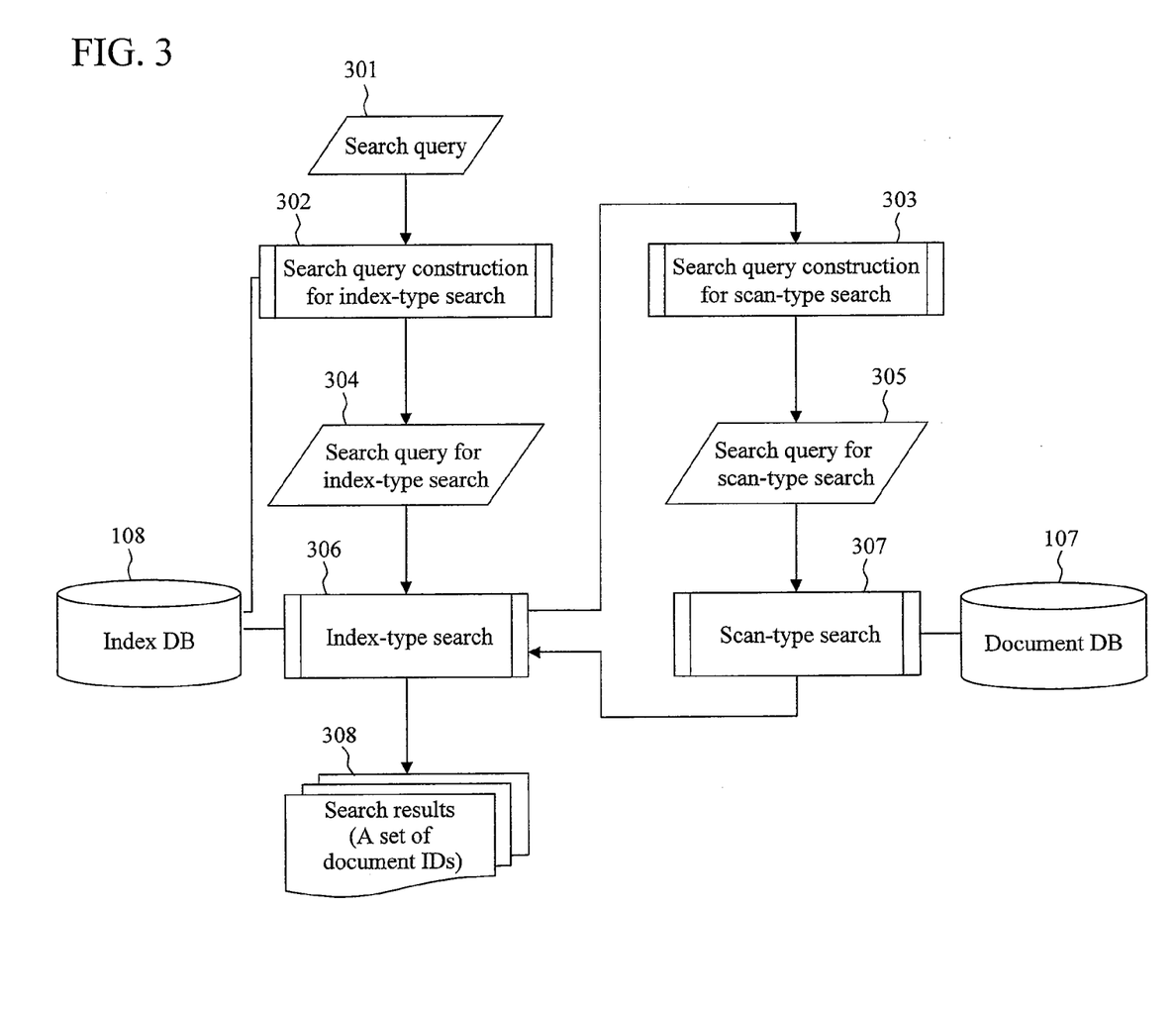
FIG. 3 is a flow chart of the processing operated in a document search server of Embodiment 3 of the present invention.

It is therefore necessary to modify the whole processing flow from the form of FIG. 2 to the form of FIG. 3. FIG. 3 differs from FIG. 2 in a point that a scan-type search step 307 is required as the internal processing of an index-type search 306.

In the index-type search 306, the document ID list 413 for each search term is acquired from the index DB 108. Since the document ID list 413 is sorted in ascending order of the document IDs, checking document IDs in a plural document lists for all the search terms can be concurrently proceeded. For the details, see Baeza-Yates, R., Ribeiro-Neto, B., "Modern Information Retrieval", Addison-Wesley, 1999.

In short, the search results are outputted one by one from the document with a lower document ID. Concurrently, at the point when the each search result is outputted, it is already determined whether or not the relevant document includes each search term. When the scan-type search 307 is required immediately thereafter, the similar processing as that of FIG. 2 can be performed. In FIG. 2, after completing the index-type search once, the scan-type search is performed collectively on a set of documents of search results, while in FIG. 3, the scan-type search is performed every time the each document is hit in the index-type search.

The method of FIG. 3 has an advantage that the information whether or not a search term exists in a hit document can be easily passed to the scan-type search step 307. Moreover, in this embodiment, since a character 2-gram is used as the search term of the index-type search, the search of a one-character or two-character keyword is completed only with the index-type search, thus checking the actual presence or absence of the search keyword in the scan-type search is not needed. Accordingly, the number of such search keywords for performing the scan-type search can be reduced using the results in the index-type search before performing the scan-type search 307. Especially in this case, since a search keyword which can be omitted in the scan-type search is a short one-character or two-character keyword, search for the short keyword is no more needed in the scan-type search, and thereby the cause of reduction in speed of the scan-type search can be removed.

It should be noted, however, that it is necessary in this case to construct in advance a search query for the index-type search so that a short one-character or two-character keyword may be always searched in the index-type search at the search query construction for index-type search 302. It is therefore necessary to force the WB1 (a set of character 2-grams for performing the index-type search) of FIG. 7 (corresponding to Embodiment 1) and FIG. 8 (corresponding to Embodiment 2) to include character 2-grams derived from one-character or two-character keywords.

Specifically, with regard to the processings of FIG. 7, at the initial setting of S701, a character 2-gram originating from a one-character or two-character keyword may be extracted from WB in advance, and then the extracted character 2-gram may be included in WB1 in S707. Similarly, with regard to the processings of FIG. 8, at the initial setting of S801, a character 2-gram originating from a one-character or two-character keyword may be extracted from WB in advance, and then the character 2-gram extracted in advance may be included in WB1 in S805. In S705 and S803, the number of hits for the character 2-gram extracted in advance is obtained separately and then the whole number of hits is estimated using the number of hits obtained separately. With the processings described above, a character 2-gram originating from a one-character or two-character keyword is always searched in the index-type search.

It should be noted that, because the same processings in FIG. 7 or FIG. 8 are performed except the above processing, such search query that compensates the disadvantage of the index-type search is also achieved in this embodiment.

Figure 9:
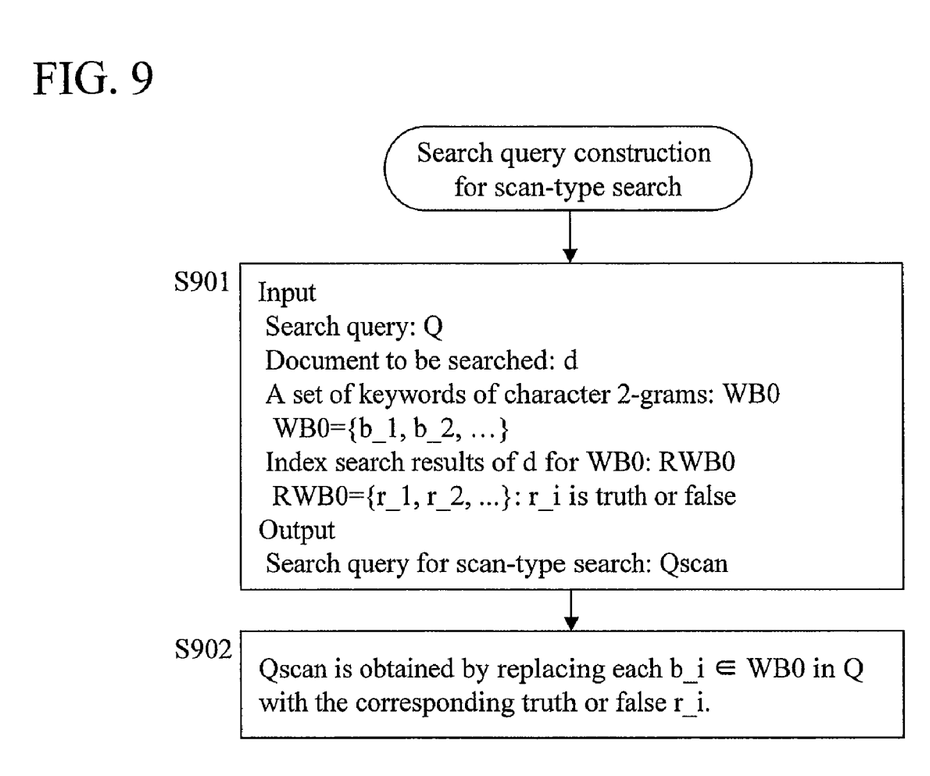
FIG. 9 is a flowchart of a search query construction for scan-type search of Embodiment 3 of the present invention.

Next, a specific processing procedure of the search query construction for scan-type search 303 is shown in FIG. 9. As explained above, this processing is required by the index-type search 306 for each hit document, and at the point when required, whether or not a search term exists that has been searched by the index-type search is already determined. Accordingly, in S901, when denoting the original search query as Q, a document to be searched (document to be hit) as d, and a set of character 2-grams which consists a keyword by itself (actually, a character 1-gram is also included) as WB0, a set of search results RWB0 of the hit document d for WB0 is already determined. The element of RWB0 indicates truth or false as to whether or not a corresponding element of WB0 appears in d.

Accordingly, in S902, if a keyword in Q corresponding to each keyword of WB0 is replaced with the corresponding truth or false in RWB0, a search query for scan-type search Qscan is obtained. Thereafter, the ordinary scan-type search 307 may be performed on d.

As described above, according to the present invention, such a hybrid-type search that compensates the disadvantage of both the index-type search and the scan-type search can be achieved. In addition, reference numerals in the accompanying drawings represent as follows:
10 document search server
101 CPU
102 memory
103 search query construction part
104 index-type search part
105 scan-type search part
106 data communication part
107 document DB
108 index DB
11 network
12 document search client

What is claimed is:

1. A document search method with which a document search apparatus searches for a document from a document database (DB) in response to an input of a search query consisting of keywords that are combined using a logical formula, the document search apparatus including: a central processing unit (CPU); the document DB storing documents to be searched; and an index DB storing an index term included in the documents to be searched, the number of documents including the index term, and a document list of documents including the index term,
the method comprising causing the document search apparatus to execute the steps of:
constructing a search query for an index-type search, by replacing each keyword included in the inputted search query with conjunctions of index terms constituting the keyword;
calculating a sum of a time required for an index-type search and a time required for a scan-type search, the sum representing an estimated value of a total search time required for the index-type search and scan-type search; wherein the time required for the index-type search and the number of documents to be searched are estimated for each term in the search query for an index-type search, the estimate being made by regarding, as hitting all the documents, another term having a larger number of hits than the each term in reference to the document index DB; and wherein the time required for the scan-type search, in which the estimated number of documents are scanned by using the inputted search query, is estimated;
constructing a search query for an index-type search by replacing, with a logical TRUE, a term which is regarded as hitting all documents when the estimated total search time takes the minimum value;
performing an index-type search using the search query for an index-type search including the logical TRUE;
performing a scan-type search on a document, which is searched by the index-type search, by using the inputted search query; and
outputting a document that is returned by the scan-type search.

2. The document search method according to claim 1, wherein the index term is a character 2-gram.

3. The document search method according to claim 1, wherein
a time required for reading all the elements in a document list stored in the index DB is calculated for terms in the search query for an index-type search except for the terms regarded as hitting all documents, and
the required time thus calculated is used as an estimated value of the time required for the index-type search for the terms.

4. The document search method according to claim 1, wherein an estimated number of documents to be searched by the index-type search is determined as any one of: a smaller number of the numbers of hits of respective terms when the terms are ANDed in a partial search query of the search query for an index-type search; a sum of the numbers of hits of respective terms when the terms are ORed; and the number of all documents when the sum exceeds the number of all documents in the latter case.

5. The document search method according to claim 1, wherein previously given information concerning an average document length per document and a speed of scanning characters is used to estimate the required time for the scan-type search.

6. A document search method with which a document search apparatus searches for a document from a document database (DB) in response to an input of a search query consisting of keywords that are combined using a logical formula, the document search apparatus including: a central processing unit (CPU); the document DB storing documents to be searched; and an index DB storing an index term included in the documents to be searched, the number of documents including the index term, and a document list of documents including the index term,
the method comprising causing the document search apparatus to execute the steps of:
constructing a search query for an index-type search, by replacing each keyword included in the inputted search query with conjunctions of index terms constituting the keyword;
sorting terms in the search query for an index-type search in ascending order of the number of hits with reference to the index DB;
estimating the number of documents to be searched by the index-type search using the search query for an index-type search, by obtaining any one of: a smaller number of the numbers of hits of respective terms when the terms are ANDed in a partial search query of the search query for an index-type search; a sum of the numbers of hits of respective terms when the terms are ORed; and the number of all documents when the sum exceeds the number of all documents in the latter case;

estimating a time required for performing a scan-type search in which the estimated number of documents are scanned by using the inputted search query;

calculating a maximum number of elements in a document list in the index DB, the elements being readable within a time obtained by subtracting the time required for the scan-type search from a given target time of searching;

calculating a cumulative sum of the numbers of hits of terms in the sorted terms from the top term of the ascending order of sorted terms, until the cumulative sum reaches the maximum number of elements, and constructing a search query for an index-type search by replacing a term with a logical TRUE, the replaced term being the first term in the ascending order whose number of hits is not added to the cumulative sum when the cumulative sum exceeds the maximum number of elements:

performing an index-type search using the search query for an index-type search including the logical TRUE;

performing a scan-type search in which a document searched by the index-type search is scanned by using the inputted search query; and outputting a document returned by the scan-type search.

7. The document search method according to claim 6, wherein the index term is a character 2-gram.

8. The document search method according to claim 6, wherein previously given information concerning an average document length per document and a scanning speed is used to estimate the time required for the scan-type search.

9. A document search method with which a document search apparatus searches for a document from a document database (DB) in response to an input of a search query consisting of keywords that are combined using a logical formula, the document search apparatus including: a central processing unit (CPU); the document DB storing documents to be searched; and an index DB storing a character 2-gram used as an index term included in the documents to be searched, the number of documents including the index term, and a document list of documents including the index term, the method comprising causing the document search apparatus to execute the steps of:

constructing a search query for an index-type search, by replacing each keyword included in the inputted search query with conjunctions of the index terms constituting the keyword;

calculating a sum of a time required for an index-type search and a time required for a scan-type search, the sum representing an estimated value of a total search time required for the index-type search and scan-type search; wherein the time required for the index-type search and the number of documents to be searched are estimated for each term in the search query for an index-type search, the estimate being made by regarding as hitting all the documents in reference to the document index DB, other terms each having a larger number of hits than the each term and not originating from a one-character or two-character keyword; and wherein the time required for the scan-type search, in which the estimated number of documents are scanned by using the inputted search query, is estimated;

constructing a search query for an index-type search by replacing, with a logical TRUE, a term which is regarded as hitting all documents when the estimated total search time takes the minimum value;

performing the index-type search using the search query for an index-type search including the logical TRUE;

performing a scan-type search using a search query every time a document is searched by the index-type search, the search query having a one-character or two-character keyword in the inputted search query replaced with a logical TRUE or FALSE to reflect a search result of a character 2-gram originating from the one-character or two-character keyword; and outputting a document that is returned by the scan-type search.

10. The document search method according to claim 9, wherein a time required for reading all the elements in a document list stored in the index DB is calculated for terms in the search query for an index-type search except for the terms regarded as hitting all documents, and the required time thus calculated is used as an estimated value of the required time for the index-type search for the terms.

11. The document search method according to claim 9, wherein an estimated number of documents to be searched by the index-type search is determined as any one of: a smaller number of the numbers of hits of respective terms when the terms are ANDed in a partial search query of the search query for an index-type search; a sum of the numbers of hits of respective terms when the terms are ORed; and the number of all documents when the sum exceeds the number of all documents in the latter case.

12. The document search method according to claim 9, wherein previously given information concerning an average document length per document and a speed of scanning characters is used to estimate the time required for the scan-type search.

13. A document search method with which a document search apparatus searches for a document from a document database in response to an input of a search query consisting of keywords that are combined using a logical formula, the document search apparatus including: a central processing unit (CPU); the document DB storing documents to be searched; and an index DB storing a character 2-gram used as an index term included in the documents to be searched, the number of documents including the index term, and a document list of documents including the index term, the method comprising causing the document search apparatus to execute the steps of:

constructing a search query for an index-type search, by replacing each keyword included in the inputted search query with conjunctions of the index terms constituting the keyword;

sorting terms in the search query for an index-type search in ascending order of the number of hits with reference to the index DB;

estimating the number of documents to be searched by the index-type search using the search query for an index-type search, by obtaining any one of: a smaller number of the numbers of hits of respective terms when the terms are ANDed in a partial search query of the search query for an index-type search; a sum of the numbers of hits of respective terms when the terms are ORed; and the number of all documents when the sum exceeds the number of all documents in the latter case;

estimating a time required for performing a scan-type search in which the estimated number of documents are scanned by using the inputted search query;

calculating the number of elements in a document list in the index DB, the elements being readable within a time obtained by subtracting the time required for the scan-type search from a given target time of searching, and determining a maximum number of elements by subtracting the calculated number of elements by the number of hits of a character 2-gram originating from a one-character or two-character keyword;

calculating a cumulative sum of the numbers of hits of terms in the sorted terms from the top term of the ascending order of sorted terms, until the cumulative sum reaches the maximum number of elements, and constructing a search query for an index-type search by replacing a term with a logical TRUE, the replaced term being the first term in the ascending order whose number of hits is not added to the cumulative sum when the cumulative sum exceeds the maximum number of elements;

performing the index-type search using the search query for index-type search including the logical TRUE;

performing a scan-type search using a search query every time a document is searched by the index-type search, the search query having a one-character or two-character keyword in the inputted search query replaced with a logical TRUE or FALSE to reflect a search result of a character 2-gram originating from the one-character or two-character keyword; and outputting a document that is returned by the scan-type search.

14. The document search method according to claim 13, wherein previously given information concerning an average document length per document and a speed of scanning characters is used to estimate the time required for the scan-type search.

15. A document search apparatus adapted to search for a document from a document database (DB) in response to an input of a search query consisting of keywords that are combined using a logical formula, the document search apparatus including:

a central processing unit (CPU);
a memory;
the document DB storing documents to be searched;
an index DB storing an index term included in the documents to be searched, the number of documents including the index term, and a document list of documents including the index term, a search query construction part configured to construct a search query for an index-type search, by replacing each keyword included in the inputted search query with conjunctions of index terms constituting the keyword; to calculate a sum of a time required for an index-type search and a time required for a scan-type search, the sum representing an estimated value of a total search time required for the index-type search and scan-type search, wherein the time required for the index-type search and the number of documents to be searched are estimated for each term in the search query for an index-type search, the estimate being made by regarding, as hitting all the documents, another term having a larger number of hits than the each term in reference to the document index DB, and wherein the time required for the scan-type search, in which the estimated number of documents are scanned by using the inputted search query, is estimated; and to construct a search query for an index-type search by replacing, with a logical TRUE, a term which is regarded as hitting all documents when the estimated total search time takes the minimum value;

an index-type search part configured to perform an index-type search using the search query for an index-type search including the logical TRUE;

a scan-type search part configured to perform a scan-type search on a document, which is searched by the index-type search, by using the inputted search query; and a data communication part configured to output a document that is returned by the scan-type search.

* * * * *